(12) United States Patent
Anabtawi et al.

(10) Patent No.: US 9,333,820 B2
(45) Date of Patent: May 10, 2016

(54) EXPANDABLE TRAILER VEHICLE

(71) Applicants: Nizam Anabtawi, Tinley Park, IL (US);
Jamal Shaban, Tinley Park, IL (US)

(72) Inventors: Nizam Anabtawi, Tinley Park, IL (US);
Jamal Shaban, Tinley Park, IL (US)

( * ) Notice: Subject to any disclaimer, the term of this patent is extended or adjusted under 35 U.S.C. 154(b) by 0 days.

(21) Appl. No.: 14/634,518

(22) Filed: Feb. 27, 2015

(65) Prior Publication Data
US 2015/0246699 A1 Sep. 3, 2015

Related U.S. Application Data

(60) Provisional application No. 61/945,328, filed on Feb. 27, 2014.

(51) Int. Cl.
| | |
|---|---|
| *B60P 3/34* | (2006.01) |
| *B60D 1/06* | (2006.01) |
| *B60P 3/42* | (2006.01) |
| *E04B 1/344* | (2006.01) |
| *B62D 63/06* | (2006.01) |

(52) U.S. Cl.
CPC ... *B60D 1/06* (2013.01); *B60P 3/34* (2013.01);
*B60P 3/42* (2013.01); *B62D 63/061* (2013.01);
*E04B 1/344* (2013.01); *E04B 1/3444* (2013.01)

(58) Field of Classification Search
CPC .......... B60P 3/34; B60P 3/42; B62D 63/061; E04B 1/344; E04B 1/3444
See application file for complete search history.

(56) References Cited

U.S. PATENT DOCUMENTS

| | | | |
|---|---|---|---|
| 3,107,116 A | 10/1963 | Meaker | |
| 3,782,063 A | 1/1974 | Batorewicz | |
| 3,861,716 A * | 1/1975 | Baxter | B62D 53/065 280/423.1 |
| 5,761,854 A * | 6/1998 | Johnson | B60P 3/34 135/116 |
| 5,765,316 A * | 6/1998 | Kavarsky | E04B 1/3442 52/143 |
| 5,797,224 A | 8/1998 | Gunthardt | |
| 5,966,956 A * | 10/1999 | Morris | F25D 11/003 52/69 |
| 6,224,126 B1 | 5/2001 | Martin | |
| 7,828,367 B2 | 11/2010 | Hickam | |
| 8,267,455 B1 | 9/2012 | Ludwick | |
| 2015/0315776 A1 * | 11/2015 | Duncan | A01G 9/14 52/66 |

* cited by examiner

*Primary Examiner* — Anne Marie Boehler
*Assistant Examiner* — Marlon Arce
(74) *Attorney, Agent, or Firm* — Global Intellectual Property Agency LLC

(57) ABSTRACT

An expandable trailer vehicle is provided. The trailer vehicle comprises a wheeled vehicle frame that is adapted to be towed by a towing vehicle. The vehicle frame supports an expandable trailer structure having a front and rear wall, a floor, and a roof. The trailer structure includes expandable sections from the sides thereof, whereby a pair of L-shaped expandable side sections pivots outward from the sides of the trailer structure and form the floor and outer walls when deployed. Pivoting sidewalls pivot forward and rearward from the sides of the trailer structure to form the front and rear walls of the expanded section, closing out the L-shaped side sections when in a deployed state. A pair of side section roof surfaces extends from the roof of the trailer vehicle to close off the upper surface of the L-shaped side sections when in a deployed state.

8 Claims, 3 Drawing Sheets

EXPANDABLE TRAILER VEHICLE

CROSS REFERENCE TO RELATED APPLICATION

This application claims the benefit of U.S. Provisional Application No. 61/945,328 filed on Feb. 27, 2014. The above identified patent application is herein incorporated by reference in its entirety to provide continuity of disclosure.

BACKGROUND OF THE INVENTION

Field of the Invention

The present invention relates to towable trailers and expandable vehicles. More specifically, the present invention relates to an expandable trailer vehicle that includes an expanding structure that expands the square footage of the trailer vehicle from the sides thereof to expand the living space when desired.

Recreational vehicles and trailers provide users with a living space that can be taken on the road and one that can be transported from one location to another. Take long road trips using such vehicles is a popular vacation, whereby travelers can live out of the trailer for extended periods and stay in campsites or other locations without finding local accommodations. A mobile living space eliminates the need for hotel rooms and allows users to cook and sleep in the vehicle when traveling long distances or while traveling for long periods of time.

Most recreational vehicles provide a dedicated floor area that includes a living space, a bed, and option kitchen amenities and restrooms. The floorplan is generally static and is one of limited size, based on the size of the road and the appropriate length for maneuvering the vehicle with a towing vehicle. Some recreational vehicles and trailers offer expandable sections to increase this living space, in which the sections are expanded outward and the square footage of the interior is increased when the vehicle is parked. The present invention, however, provides a new and unique structure that expands the floor plan of a trailer vehicle. The present invention can be expanded to a state that is at upwards of three times the area of the trailer vehicle stowed state.

Trailer vehicles are generally towed by a towing vehicle using one of a trailer hitch attachment or a fifth wheel attachment. The present invention contemplates a structure that can be towed using one of these configurations. The front end of the trailer vehicle includes a trailer tongue for attachment to a trailer hitch ball, or alternatively comprises a more robust gooseneck structure and fifth wheel connector for towing the trailer using a larger towing vehicle.

SUMMARY OF THE INVENTION

The following summary is intended solely for the benefit of the reader and is not intended to be limiting in any way. The present invention provides a new trailer vehicle with an expandable structure, wherein the same can be utilized for providing convenience for the user when expanding the area of a towed trailer vehicle for increased living space.

It is therefore an object of the present invention to provide a new and improved expandable trailer vehicle that has all of the advantages of the prior art and none of the disadvantages.

It is another object of the present invention to provide an expandable trailer vehicle having expandable side portions that comprise L-shaped sections that pivot outwards and downward to form the floor and outer side wall of the vehicle when deployed.

Another object of the present invention is to provide an expandable trailer vehicle that has a stowed state that accommodates vehicle lanes and one that can be used to store items therein prior to expanding into a deployed state when the vehicle is parked.

Yet another object of the present invention is to provide an expandable trailer vehicle that includes pivoting sidewalls that pivot from the sides of the trailer vehicle to form the front and rear wall of the expanded sections when deployed.

Another object of the present invention is to provide an expandable trailer vehicle that includes slidable roof sections that slide from the trailer vehicle roof and enclose the expanded sections when the L-shaped side sections are pivoted outward and the pivoting sidewalls are pivoted into a deployed state, thereby closing out the expanded sections along both sides of the trailer vehicle.

Another object of the present invention is to provide an expandable trailer vehicle that includes a trailer frame that supports one or more rows of trailer wheels, and furthermore that is towed from the front end using one of a trailer hitch attachment or a fifth wheel attachment.

Another object of the present invention is to provide an expandable trailer vehicle that includes access doors through the front and rear walls of the trailer vehicle, and one that may support one or more windows in the expanding portions of the vehicle for natural light when the vehicle is deployed in its expanded state.

Another object of the present invention is to provide an expandable trailer vehicle that contemplates a new method of expansion.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
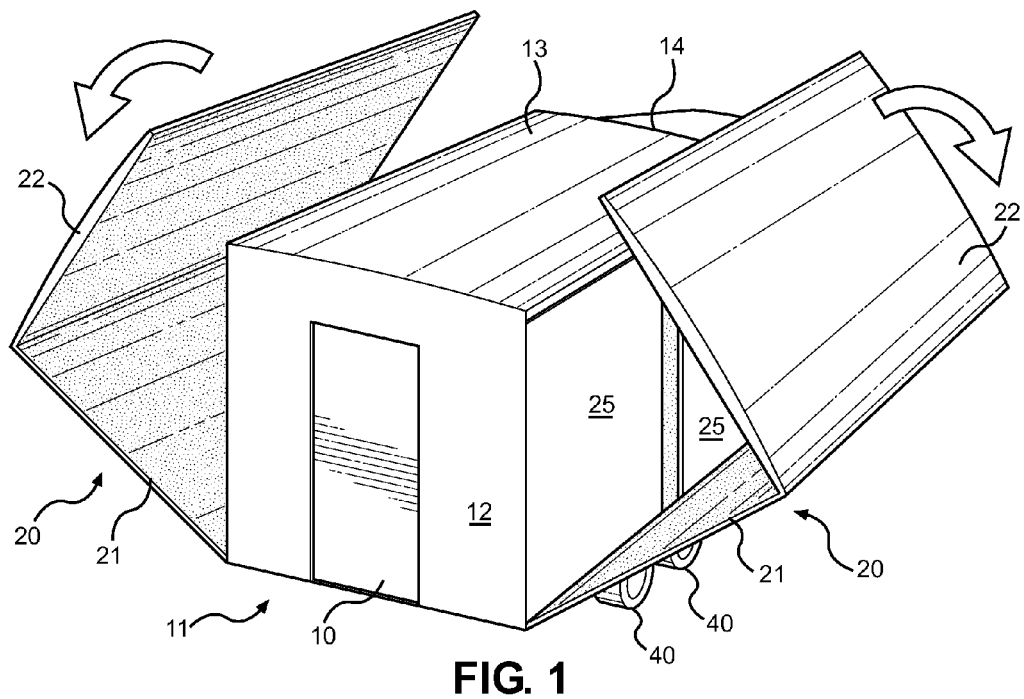
FIG. 1 shows a view of the expandable trailer vehicle in the first step of the expansion process, whereby the L-shaped side sections are released and pivot outward and downward from the sides of the trailer vehicle.

Reference is made herein to the attached drawings. Like reference numerals are used throughout the drawings to depict like or similar elements of the expandable trailer vehicle of the present invention. For the purposes of presenting a brief and clear description of the present invention, the preferred embodiment will be discussed as used for providing a new and unique method and structure of expanding a trailer vehicle. The figures are intended for representative purposes only and should not be considered to be limiting in any respect.

Referring now to FIG. 1, there is shown a perspective view from the rear of the expandable trailer vehicle in which the first step in the expansion process of the trailer vehicle is shown. The trailer vehicle has a stowed state that has an elongated, rectangular floor area that is generally greater along its longitudinal axis than it its lateral axis. The trailer vehicle expands into a deployed state that is substantially square, whereby the floor area is increased upwards of three times after expansion. The present invention discloses a new and unique expansion process that allows the floor plan to be expanded once the vehicle is parked. When stowed, the vehicle conforms to the width of most roads for ease of towing.

The trailer vehicle itself comprises a trailer a vehicle frame having one or more sets of wheels 40 along its length, a rear end 11, and a front end 14 having a towing vehicle attachment device thereon. The towing vehicle attachment device is one that allows the front end 14 of the trailer to be affixed to a towing vehicle. Common examples include a trailer tongue for attachment to the hitch ball of a trailer hitch, as well as larger trailer hitch attachment devices in the form of a gooseneck structure and fifth wheel attachment. This latter embodiment is useful for attaching the trailer to a larger towing vehicle, such as a tractor trailer or pickup truck with a fifth wheel.

The trailer vehicle frame supports an expandable trailer structure thereon, which comprising a front wall, a rear wall 12, a floor, and a roof 13 extending between the front and rear walls. The roof 13 extends from the rear end of the vehicle frame to substantially the front end. Along the sides of the trailer structure is a pair of side sections 20, which rotate laterally outwards and downwards from the sides of the trailer structure. The side sections 20 fold outwards, thereafter pivoting sidewalls pivot outward from the trailer structure to close off the front and rear opens sections of the deployed side sections 20. Thereafter, deployable roof surfaces are slide from a channel in the roof 13 to secure over the expanded sections. Each of these steps of expansion will be described in detail below.

Referring specifically to FIG. 1, the first step in the expansion process involves deployment of the side sections 20 from the sides of the trailer. The side sections 20 are substantially L-shaped members that are hinged to the vehicle along a bottom edge. A side section hinge is positioned longitudinally along the sides of the trailer vehicle and along a lower edge thereof. The side section hinge allows the L-shaped side section 20 to rotate from a stowed position to a deployed position by rotating the side section 20 outward and downward from the vehicle sides. The side sections 20 includes a first wall 21 and a second wall 22, whereby each first wall 21 is pivotably connected at a lower end to a side of the trailer structure via the longitudinal side section hinge.

In a stowed state, the first wall 21 of the side section 20 forms the outermost sidewall of the trailer vehicle and is substantially vertical. The second wall 22 extends over the roof 13 of the trailer vehicle and is substantially horizontal and coextensive with the roof 13 when the side sections 20 are stowed. When deployed, the first wall 21 pivots downward from the side section hinge and into a substantially horizontal state, forming the floor of the expanded side section that is substantially in plane with the floor of the trailer structure. The second wall 22 is substantially vertical when deployed, forming the outermost sidewall of the vehicle when the vehicle is expanded. Thus when deployed, the side sections 20 a new floor section and a new outer wall, whereby the floor area is effectively increased and the outer side walls are disposed farther from the centerline of the trailer structure.

Figure 2:
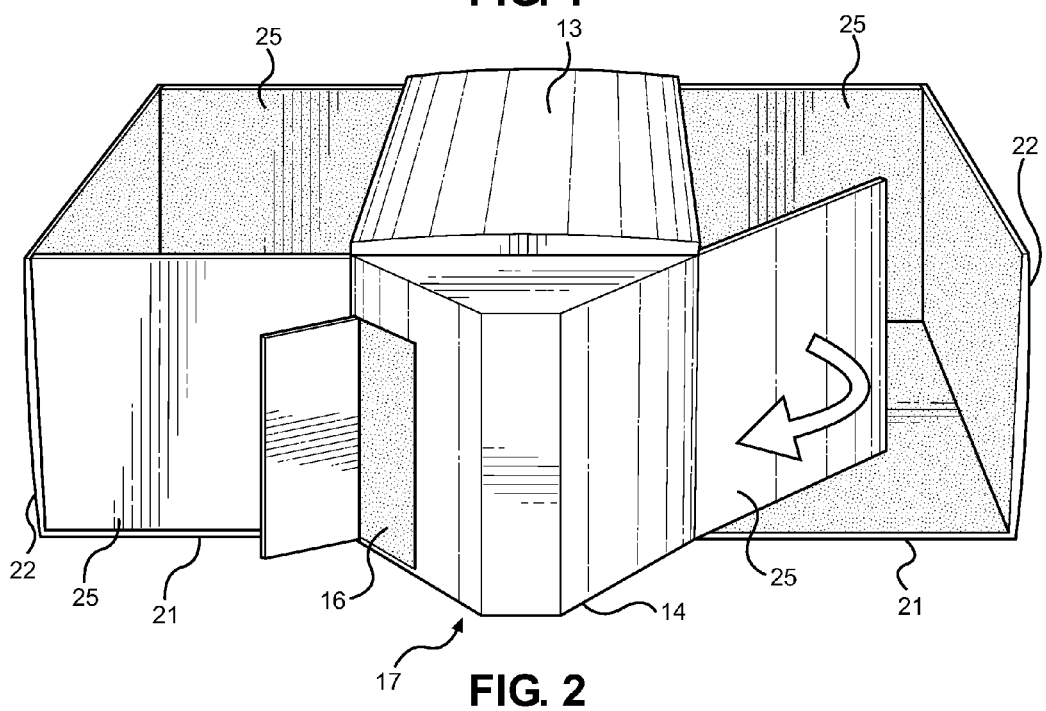
FIG. 2 shows a frontal view of the trailer vehicle, whereby the side sections are in a deployed state and the pivoting sidewalls are pivoting outward from the sides of the trailer vehicle to close out the front and rear walls of the expanded sections.

Referring to FIG. 2, after the side section have been deployed, a pair of pivoting sidewalls 25 extend from the trailer structure to close out the exposed gap between the side section and the trailer structure along the front and rear of the trailer. A pair of pivoting sidewalls 25 is located along each side of the trailer structure (four in total). The pivoting sidewalls 25 are pivotably connected to opposing sides of the front wall of the trailer structure and the rear wall of the trailer structure. Each pivoting sidewall 25 is connected to the trailer structure via a substantially vertical hinge that allows the sidewalls to pivot from a position aligned with the sides of the trailer (i.e. in line with the longitudinal axis of the trailer) to a position that is perpendicular thereto (i.e. extending along a later axis from the trailer). The sidewalls 25 may alternatively extend at angles between parallel and perpendicular to the trailer depending on the length of the side sections. Therefore, intermediate pivot angles are contemplated. When the pivoting sidewalls 25 are fully deployed, they align with the first 21 and second 22 wall of the expanding sections to enclose the front and rear portions thereof. At this point, the expansion sections are deployed but do not have a roof covering thereover.

Figure 3:
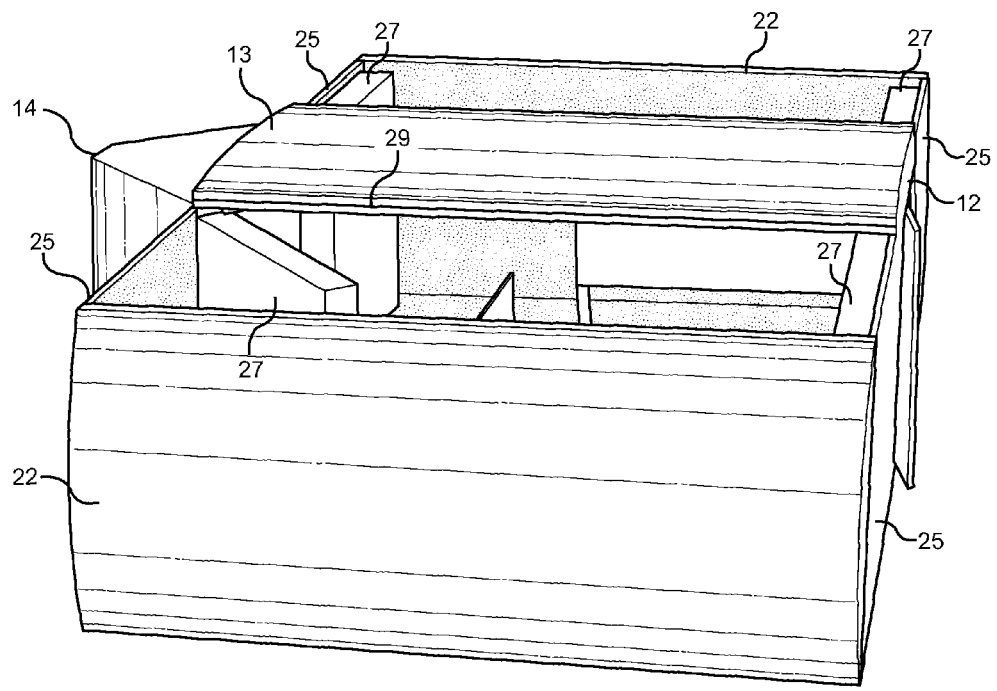
FIG. 3 shows a perspective side view of the trailer vehicle, whereby roof support members are being pivoted from the sides of the trailer vehicle and in alignment with the front and rear walls of the expanded sections.
Figure 4:
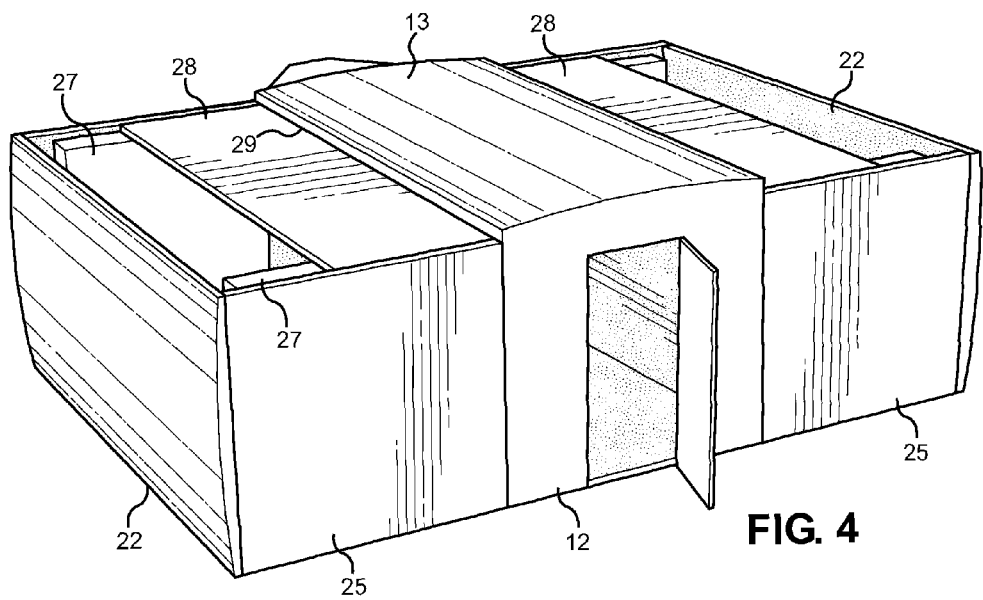
FIG. 4 shows a rear perspective view of the trailer vehicle, whereby the roof surfaces are being deployed from the roof of the trailer vehicle and over the expanded sections.

Referring to FIGS. 3 and 4, there are shown views of the next step in the expansion process, whereby the roof surfaces 28 are extended over the expanded sections of the trailer. A pair of roof surfaces 28 is stowed within a cavity in the roof 13 of the trailer structure, wherein each is slidable therefrom over the exposed upper of the expanded sections. After the side sections have been deployed, the second wall 22 of the side sections and the pivoting sidewalls 25 of the vehicle form the sidewalls of the expanded sections. The roof surfaces 28 extend over the expanded sections and enclose the same from above, forming a roof that can be attached to the expanded section to prevent leaks.

The roof sections 28 extend along the upper portions of the expanded sections and are supported by the vertical walls thereof, or alternatively are supported by additional pivoting roof support members 27 as shown in FIGS. 3 and 4. It is contemplated that the roof may be supported along its forward and rear edges by a roof support member 27 that pivots outward from the sides of the trailer structure in a similarly manner as the pivoting sidewalls 25. These structures support the roof surface 27 and brace the forward and rear portions of the expanded section when the vehicle is fully deployed.

The roof surfaces 28 are stowed within a cavity in the roof 13 of the trailer structure. The roof surfaces 28 overlap one another and are slidable from the channel through a slot 29 along the outer edges of the roof 13 when deploying the roof surfaces 28 over the expanded sections. The roof sections are preferably mounted along slide rails within the roof 13 of the trailer structure, whereby the interior corners of the roof surfaces are supported within the rails to allow sliding of the same when the user pulls the roof surfaces 28 from the roof cavity.

Referring to FIGS. 1 through 5, the trailer structure includes a forward end 14 and a rear end 11. The ends include access doors 10 to allow a user to enter and exit the trailer structure when deployed or when stowed. The interior of the trailer structure is condensed when the side sections are stowed and the pivoting sidewalls are pivoted into a stowed state. The doors 10 provide access to the interior of the trailer vehicle when the vehicle is stowed or expanded.

Figure 5:
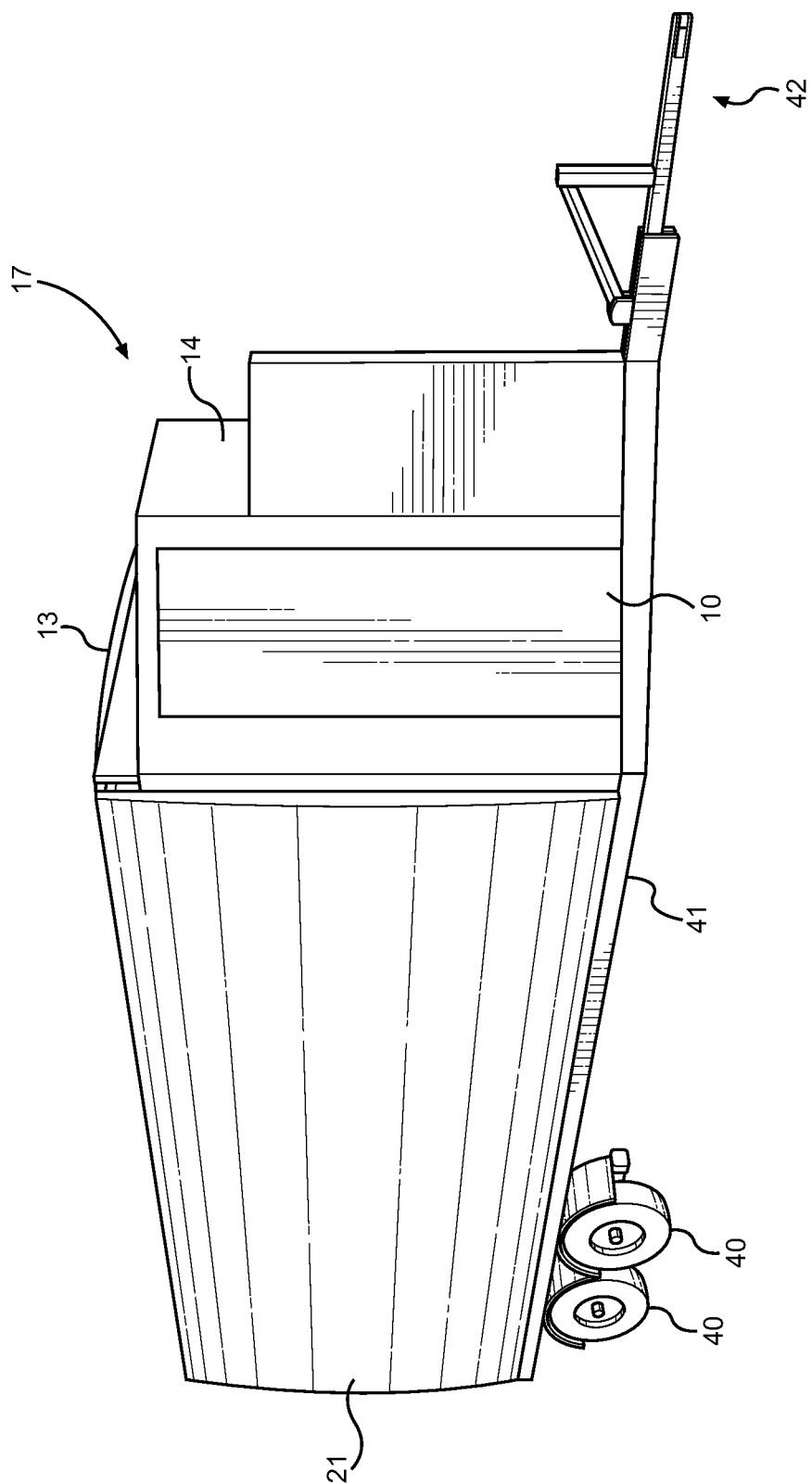
FIG. 5 shows a view of the trailer vehicle in a stowed state ready for transport.

Referring specifically to FIG. 5, the front end of the trailer is shown. The front end 14 may include a protruding portion 17 that forms an access area to the interior. The protruding portion 17 also increases the aerodynamic qualities of the trailer vehicle when the vehicle is in motion, whereby the protruding portion preferably includes a narrower leading edge that tapers outward to join the sides of the trailer, thereby reducing drag on the vehicle at higher speeds. The side sections may include windows therealong to allow for natural light to enter the cabin when stowed and when expanded.

Furthermore, the front end of the trailer vehicle includes a towing vehicle attachment device 42. The towing vehicle attachment device 42 is one of a trailer hitch tongue for attachment to a trailer hitch ball, or alternatively the vehicle attachment device 42 comprises a gooseneck portion of the vehicle and a fifth wheel attachment device. The vehicle attachment device 42 secures the trailer frame 41 to the towing vehicle, whereafter the wheels 40 facilitate rolling motion as the towing vehicle tows the trailer vehicle from the vehicle attachment device 42.

In summary, the present invention provides an expandable trailer adapted to expand the interior area of the trailer to upwards of three times its original size. The trailer comprises a center living section with collapsible side sections and a unique construction that allows significant side expansion portions when deployed.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An expandable trailer vehicle, comprising:
   a vehicle frame supporting an expandable trailer structure, the vehicle frame having one or more sets of wheels, a rear end, and a front end having a towing vehicle attachment device;
   the expandable trailer structure comprising a front wall, a rear wall, a floor, and a roof extending therebetween, the roof extending from the rear end of the vehicle frame to substantially the front end;
   a first and second expandable side section having a substantial L-shape, wherein the expandable side sections comprise a first wall and a second wall, whereby each first wall is pivotably connected at a lower end to a side of the trailer structure via a longitudinal hinge;
   the expandable side sections having a stowed state and an expanded state;
   the stowed state of each expandable side section being in which the first wall is substantially vertically disposed between the front wall and rear wall of the trailer structure, and the second wall is substantially horizontally disposed between the front wall and rear wall of the trailer structure and substantially coextensive with the roof of the trailer structure;
   the expanded state being in which the first wall is pivoted downward from a vertical to a horizontal state from one side of the trailer structure such that the first wall is substantially in plane with the floor of the trailer structure and the second wall is substantially vertical;
   a first and second pivoting sidewall disposed along each side of the trailer structure, wherein the pivoting sidewalls are disposed between the front wall and rear wall of the trailer structure;
   the first pivoting sidewalls of each side of the trailer structure having a pivot point adjacent to the front wall of the trailer structure via a vertical hinge;
   the second pivoting sidewalls of each side of the trailer structure having a pivot point adjacent to the rear wall of the trailer structure via a vertical hinge;
   a first and second side section roof surface being slidable from a cavity within the roof of the trailer structure, whereby the roof surfaces extend laterally outward from the trailer structure and secure to the expandable side sections and the pivoting sidewalls to form enclosed trailer expansion portions along both sides of the trailer structure.

2. The expandable trailer vehicle of claim 1, further comprising:
   a first and second pivoting roof support member disposed along each side of the trailer structure, wherein the pivoting roof support members are disposed between the front wall and rear wall of the trailer structure;
   the pivoting roof support members being substantially coextensive with the first and second pivoting sidewalls along both sides of the trailer structure;
   the first pivoting roof support members of each side of the trailer structure having a pivot point adjacent to the front wall of the trailer structure via a vertical hinge;
   the second pivoting roof support members of each side of the trailer structure having a pivot point adjacent to the rear wall of the trailer structure via a vertical hinge;
   the pivoting roof support member being configured to support a forward and rear portion of the first and second side section roof surface when deployed.

3. The expandable trailer vehicle of claim 1, wherein the towing vehicle attachment device comprises a trailer hitch tongue configured to secure to a trailer hitch ball.

4. The expandable trailer vehicle of claim 1, wherein the towing vehicle attachment device comprises a gooseneck and a fifth wheel attachment device.

5. The expandable trailer vehicle of claim 1, wherein the first wall of the expandable side sections further comprise at least one window.

6. The expandable trailer vehicle of claim 1, further comprising at least one access door into an interior of the trailer structure.

7. A method of expanding a vehicle trailer, comprising the steps of:
   statically positioning an expandable trailer vehicle comprising:
      a vehicle frame supporting an expandable trailer structure, the vehicle frame having one or more sets of wheels, a rear end, and a front end having a towing vehicle attachment device;

the expandable trailer structure comprising a front wall, a rear wall, a floor, and a roof extending therebetween, the roof extending from the rear end of the vehicle frame to substantially the front end;

a first and second expandable side section having a substantial L-shape, wherein the expandable side sections comprise a first wall and a second wall, whereby each first wall is pivotably connected at a lower end to a side of the trailer structure via a longitudinal hinge;

a first and second pivoting sidewall disposed along each side of the trailer structure, wherein the pivoting sidewalls are disposed between the front wall and rear wall of the trailer structure;

the first pivoting sidewalls of each side of the trailer structure having a pivot point adjacent to the front wall of the trailer structure via a vertical hinge;

the second pivoting sidewalls of each side of the trailer structure having a pivot point adjacent to the rear wall of the trailer structure via a vertical hinge;

a first and second side section roof surface being slidable from a cavity within the roof of the trailer structure;

rotating the expandable side sections from a stowed state to an expanded state;

the stowed state of each expandable side section being in which the first wall is substantially vertically disposed between the front wall and rear wall of the trailer structure, and the second wall is substantially horizontally disposed between the front wall and rear wall of the trailer structure and substantially coextensive with the roof of the trailer structure;

the expanded state being in which the first wall is pivoted downward from a vertical to a horizontal state from one side of the trailer structure such that the first wall is substantially in plane with the floor of the trailer structure and the second wall is substantially vertical;

extending a first and second side section roof surface outward from the trailer structure and securing the roof surfaces to the expandable side sections and the pivoting sidewalls to form enclosed trailer expansion portions along both sides of the trailer structure.

8. The method of claim 7, further comprising the steps of:

deploying a first and second pivoting roof support member to support each roof surface;

wherein the first and second pivoting roof support member is disposed along each side of the trailer structure, wherein the pivoting roof support members are disposed between the front wall and rear wall of the trailer structure;

the first pivoting roof support members of each side of the trailer structure having a pivot point adjacent to the front wall of the trailer structure via a vertical hinge;

the second pivoting roof support members of each side of the trailer structure having a pivot point adjacent to the rear wall of the trailer structure via a vertical hinge;

the pivoting roof support member being configured to support a forward and rear portion of the first and second side section roof surface when deployed.

* * * * *